US008856559B2

(12) United States Patent
Alarcon et al.

(10) Patent No.: US 8,856,559 B2
(45) Date of Patent: Oct. 7, 2014

(54) INTEGRATED CIRCUIT ALLOWING TO TEST A POWER MANAGEMENT UNIT BASED ON OR MORE CONDITIONS AND CONFIGURING THE PLURALITY OF PINS TO OPERATE IN NORMAL AND TEST MODE

(75) Inventors: Veronica Alarcon, San Jose, CA (US); Love Kothari, Sunnyvale, CA (US); Amar Guettaf, Sunnyvale, CA (US); Kerry Thompson, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 201 days.

(21) Appl. No.: 13/437,675

(22) Filed: Apr. 2, 2012

(65) Prior Publication Data

US 2013/0047000 A1    Feb. 21, 2013

Related U.S. Application Data

(60) Provisional application No. 61/524,538, filed on Aug. 17, 2011.

(51) Int. Cl.
| | | |
|---|---|---|
| *G06F 1/00* | (2006.01) | |
| *H03K 5/13* | (2014.01) | |
| *G06F 1/32* | (2006.01) | |
| *H03K 19/01* | (2006.01) | |
| *H03K 3/037* | (2006.01) | |
| *H03K 3/03* | (2006.01) | |
| *H03K 5/00* | (2006.01) | |

(52) U.S. Cl.
CPC ............... *H03K 19/01* (2013.01); *H03K 5/132* (2013.01); *G06F 1/32* (2013.01); *H03K 2005/00026* (2013.01); *G06F 1/3203* (2013.01); *H03K 3/0375* (2013.01); *H03K 2005/00058* (2013.01); *H03K 3/0315* (2013.01)
USPC ......................................................... 713/300

(58) Field of Classification Search
CPC ...................................................... G06F 1/3203
See application file for complete search history.

(56) References Cited

U.S. PATENT DOCUMENTS

| | | | |
|---|---|---|---|
| 5,220,298 | A | 6/1993 | Nagase |
| 7,199,607 | B2 | 4/2007 | Volkening et al. |
| 7,305,253 | B2 | 12/2007 | Snyder et al. |
| 8,090,965 | B1 * | 1/2012 | Chakravarty ................. 713/300 |
| 8,274,903 | B2 | 9/2012 | Wentink et al. |
| 8,507,907 | B2 | 8/2013 | Takahashi et al. |
| 2003/0115491 | A1 * | 6/2003 | Williams et al. .............. 713/300 |
| 2005/0240816 | A1 * | 10/2005 | Iovin et al. ...................... 714/25 |

(Continued)

FOREIGN PATENT DOCUMENTS

EP                652516 A1 *   5/1995   ............. G06F 11/00

*Primary Examiner* — Thomas Lee
*Assistant Examiner* — Gayathri Sampath
(74) *Attorney, Agent, or Firm* — Sterne, Kessler, Goldstein & Fox PLLC

(57) ABSTRACT

An integrated circuit is disclosed that contains both a PMU and another processing portion, such as a baseband. Because of the limited pins devoted to the PMU, the PMU receives most of its signals through the other processing portion of the integrated circuit. Thus, in order to protect the PMU, the integrated circuit isolates the PMU portion from receiving different signals from the other processing portion until after certain conditions are satisfied. In addition, the integrated circuit includes a GPIO pin bank in the other processing portion that can be freely configured so as to allow for testing of the PMU.

20 Claims, 8 Drawing Sheets

(56) References Cited

U.S. PATENT DOCUMENTS

2008/0307240 A1* 12/2008 Dahan et al. .................. 713/320
2009/0177923 A1* 7/2009 McGowan ...................... 714/30
2010/0281309 A1* 11/2010 Laurenti et al. ................. 714/45
2012/0233514 A1* 9/2012 Patil et al. ..................... 714/734

* cited by examiner

INTEGRATED CIRCUIT ALLOWING TO TEST A POWER MANAGEMENT UNIT BASED ON OR MORE CONDITIONS AND CONFIGURING THE PLURALITY OF PINS TO OPERATE IN NORMAL AND TEST MODE

CROSS-REFERENCED TO RELATED APPLICATIONS

This patent application claims the benefit of U.S. Provisional Patent Application No. 61/524,538, filed Aug. 17, 2011, entitled "Power Management Unit," which is incorporated herein by reference in its entirety.

BACKGROUND

1. Field of Invention

The invention relates to an electronics device, and more specifically relates to an integrated circuit that is incorporated into a host electronic device that allows for easy testing of a Power Management Unit that is integrated with another electronics component (such as a Baseband Processor).

2. Related Art

Wireless communication devices, such as cellular telephones to provide an example, are becoming commonplace in both personal and commercial settings. The wireless communication devices provide users with access to all kinds of information. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including simple amplitude modulation (AM), simple frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

Over the years, there has been increasing effort to make wireless communication devices more portable. However, because of the increased functionality of modern wireless communication devices, wireless communication devices are becoming increasingly complex. Therefore, one way to reduce the size of wireless communication devices is by combining multiple components onto a single integrated circuit (i.e., chip). For example, Broadcom Corporation has made significant advances recently in combining a power management unit (PMU) with another component (such as a baseband processor) onto a single chip. However, combining the PMU with another component significantly reduces the number of pins that can be designated for the PMU. This requires that functional signals designated for the PMU be sent through the other component, and also makes testing the PMU particularly difficult. Because the PMU is a particularly sensitive component, it is necessary to ensure that signals coming into the PMU from the other component are at satisfactory voltage levels in order to protect the PMU.

Consequently, there is a need for an integrated circuit, which includes the PMU combined with another component, that allows for effective and safe testing of the PMU, as well safe communication between the PMU and the other component. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 7:
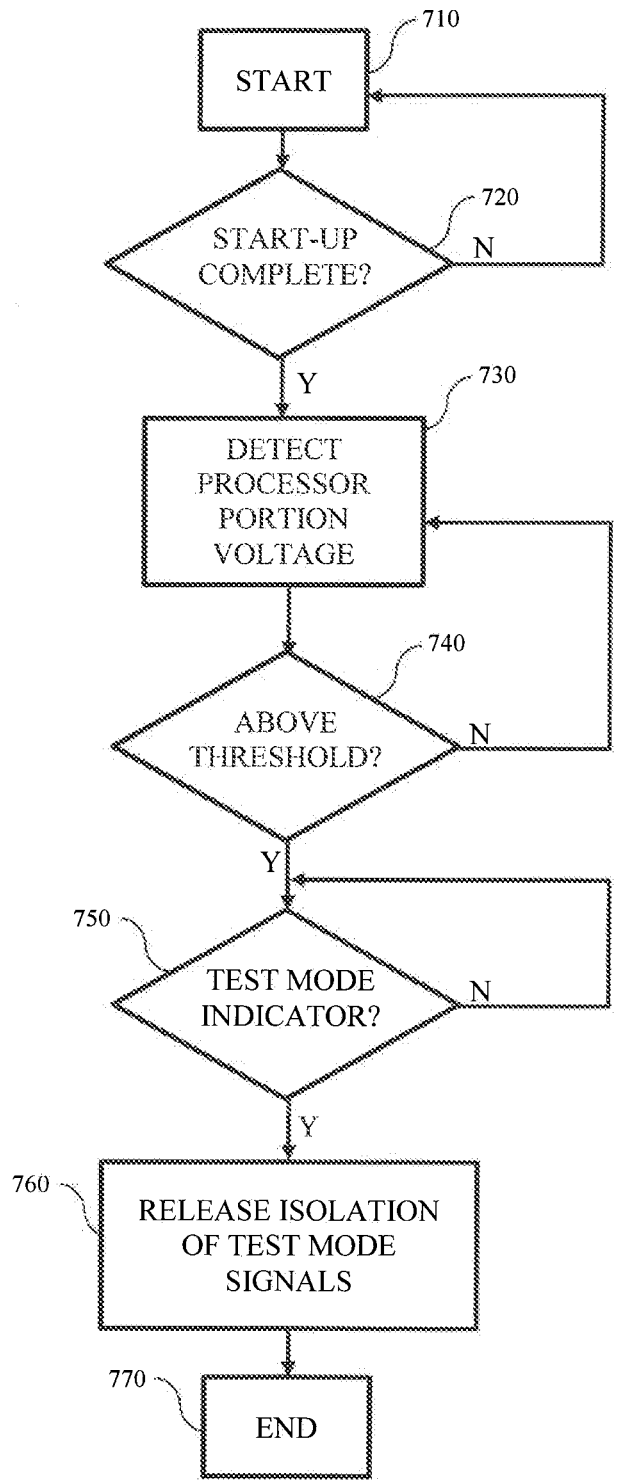
Figure 8:
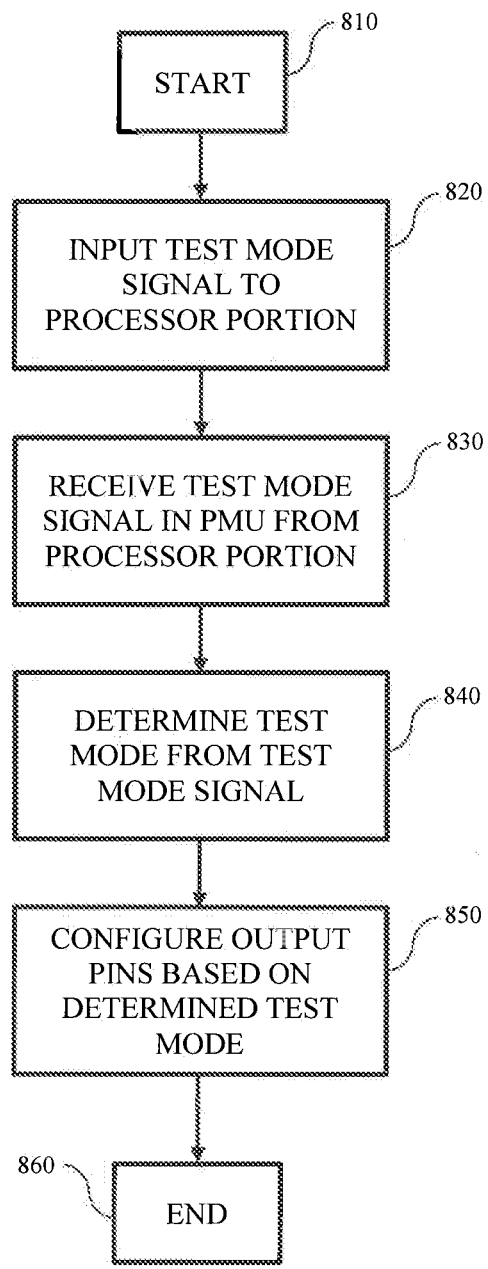

FIG. 7 illustrates a block diagram of a method for allowing test mode signals to be received by the power management module from the processor module within an integrated circuit according to an exemplary embodiment of the invention; and FIG. 8 illustrates a block diagram of a method for entering and performing a test mode within an integrated circuit according to an exemplary embodiment of the present invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware (e.g., circuits), firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although several portions of the description of the present invention may be described in terms of wireless devices (specifically cellular devices), those skilled in the relevant art(s) will recognize that the present invention may be applicable to any other devices without departing from the spirit and scope of the present invention.

An Exemplary Integrated Circuit for Protecting a PMU Contained Therein

Figure 1:
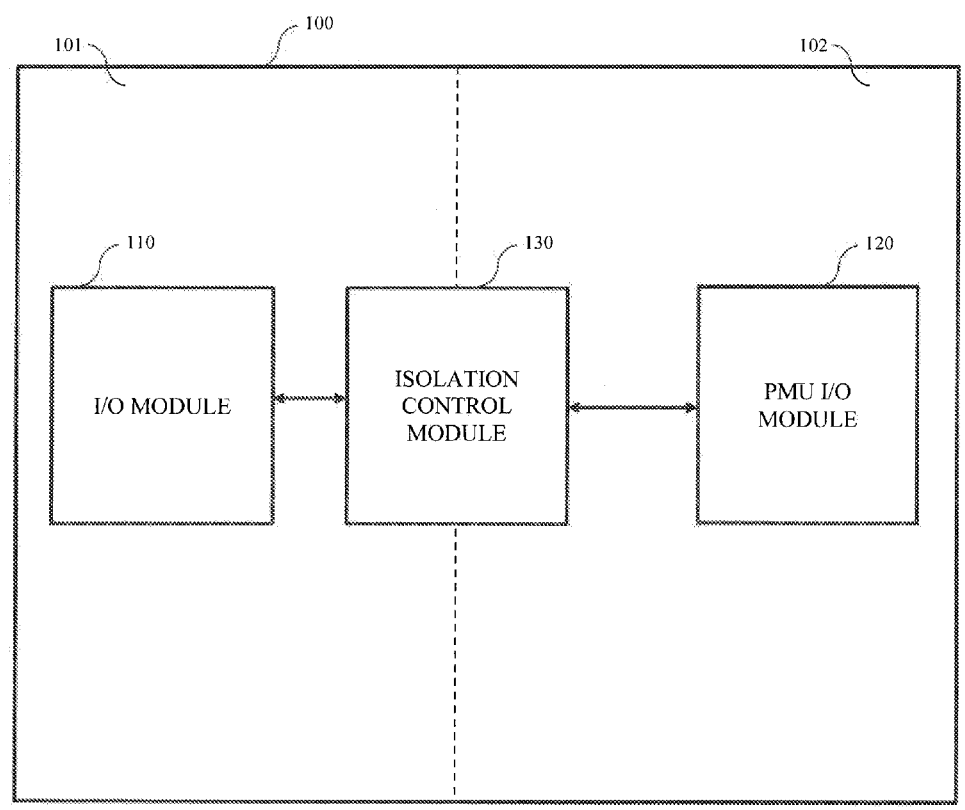
FIG. 1 illustrates a block diagram of an integrated circuit according to an exemplary embodiment of the invention.

FIG. 1 illustrates a block diagram of an integrated circuit 100 according to an exemplary embodiment of the invention. The integrated circuit 100 includes a processor portion 101 that may perform any function within the integrated circuit. For example, the processor portion 101 may be a Baseband processor. The integrated circuit 100 also includes a power management unit (PMU) portion 102 that controls the supply of power to the components of a host device within which the integrated circuit 100 resides.

The processor portion 101 includes an I/O module 110 that performs various functions of the processor module 101, including sending and receiving signals with the PMU portion 102 and sending and receiving signals with off-chip components. The PMU portion 102 includes a PMU I/O module 120 that sends and receives signals with the processor portion 101. The integrated circuit 100 also includes an isolation control module 130 configured to restrict the transfer of signals between the processor portion 101 and the PMU portion 102.

The isolation control module 130 protects the PMU portion 102. In particular, because of the sensitivity of PMUs, all inputs must be in a known state. However, inputs from the baseband processor will be unknown while the baseband processor is powered off. Therefore, the isolation control module 130 prevents the PMU portion 102 from receiving signals from the processor portion 101 until certain conditions have been satisfied (discussed below). In an embodiment, the isolation control module 130 includes a plurality of isolation gates that either allow or restrict communication between the PMU portion 102 and the processor portion 101 depending on one or more conditions, such as whether the PMU has reached a powered-on state, for example.

The isolation control module 130 may include, for example, a plurality of cells. Each cell of the isolation control module 130 is designated for a corresponding signal line from the processor portion 101 to the PMU portion 102. In this manner, each signal line that passes from the processor portion 101 to the PMU portion 102 is connected to a cell. Each cell of the isolation control module 130 prohibits the passage of signals within its corresponding signal line until certain conditions have been satisfied. Thus, in order for any signal to pass from the processor module 101 to the PMU portion 102, the certain conditions must first be satisfied.

Each cell may also perform additional functions. For example, because the PMU portion 102 will often operate within a different power domain than the processor portion 101, each cell may include a power converter that level-shifts the incoming signals to acceptable levels. Each cell also preferably includes some mechanism for protecting the PMU portion 102 from electrostatic charges.

1. Functional Signals

Figure 2:
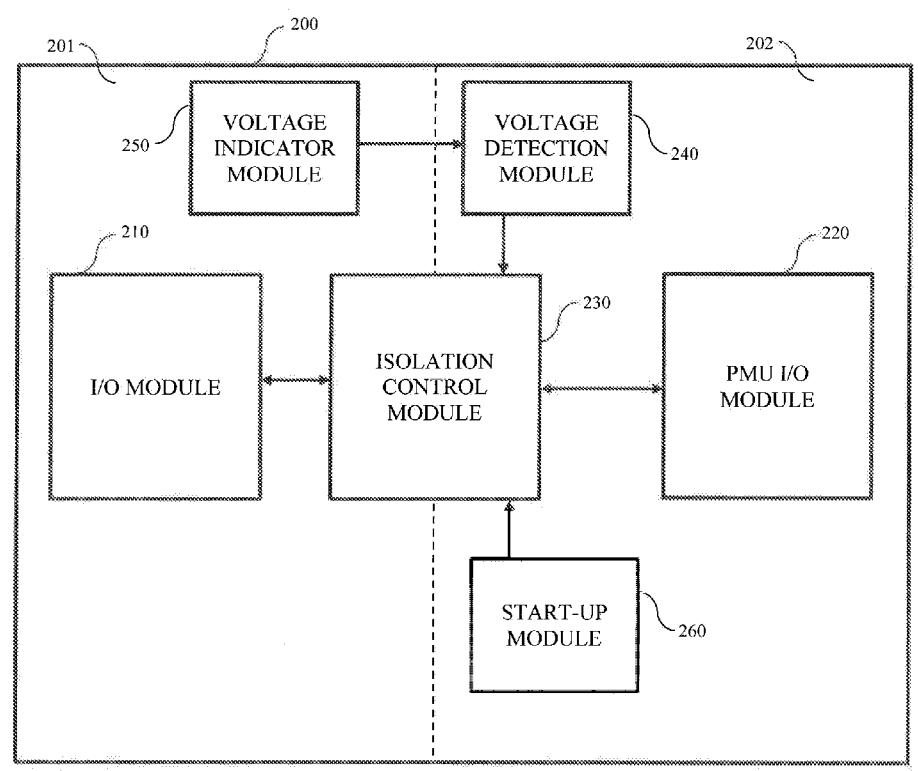
FIG. 2 illustrates a block diagram of an integrated circuit for isolating a Power Management Unit portion from functional signals.

FIG. 2 illustrates a block diagram of an integrated circuit 200 for isolating a PMU portion 202 from functional signals according to an exemplary embodiment of the invention. The integrated circuit 200 includes a voltage detection module 140 and a start-up module 260 that are each connected to an isolation control module 230, and may represent an exemplary embodiment of the integrated circuit 100.

The integrated circuit 200 includes a processor portion 201 that may represent an exemplary embodiment of the processor module 101, and the PMU portion 202 that may represent an exemplary embodiment of the PMU portion 102.

In one scenario, the processor portion 201 may wish to transfer functional (i.e., normal mode) signals to the PMU portion 202. The functional signals may include any signals generated by the processor portion, or that are received from off-chip components, that are directed to the PMU portion 202, and which are unrelated to testing the PMU portion 202. In this scenario, an I/O module 210 of the processor portion 201 forwards the functional signals to a PMU I/O module 220 via an isolation control module 230.

The isolation control module 230 may represent an exemplary embodiment of the isolation control module 130 and permits/prevents the transfer of the functional signals to the PMU I/O portion depending on whether certain conditions have been satisfied.

For example, one condition that preferably must be satisfied is the completion of the power start-up sequence for the integrated circuit 200. Specifically, the PMU portion 202 must power-up, followed by the processor portion 201 based on certain system triggers controlled by the PMU portion 202. This ensures that the entire system is powered and the input signal levels are ready to be received. The PMU portion 202 typically supplies power, or controls the supply of power, to every (or nearly every) component within the host device. Therefore, in order to ensure that the PMU portion 202 has completed the process of supplying the power to the other components and is ready to receive functional signals, and to ensure that the processor portion 201 inputs known signals, the isolation control module 230 prohibits the transfer of functional signals to the PMU portion 230 until after the integrated circuit 200 has completed its start-up operations.

Therefore, the PMU portion 202 includes a start-up module 260 that, upon receiving a user-instruction to power up the host device, performs a sequence of start-up operations in which the start-up module 260 causes power to be supplied to all necessary components within the host device. Once the start-up sequence has been completed, the start-up module 260 sends a "power start-up complete" signal to the isolation control module 230. The sending of the "power start-up complete" signal may constitute simply setting a flag within the isolation control module 230 or the start-up module 260, which the isolation control module 230 monitors. This signal indicates to the isolation control module 230 that the first condition has been satisfied for permitting the transfer of signals to the PMU portion 202.

Another condition that preferably must be satisfied is the determination that the processor portion 201 is receiving sufficient power. In an embodiment, this condition is beneficial during a testing phase, because the processor portion 201 may be externally powered. Consequently, it is necessary to actually detect that sufficient power is being received by the processor portion. Therefore, the isolation control module 230 isolates the PMU portion 202 until it has ensured that the processor portion 201 is receiving sufficient power. If the processor portion 201 is not receiving sufficient power, then signals received from the processor portion 201 are more likely to be unstable, and possibly the result of harmful interference, such as electrostatic or radio-induced signals.

Therefore, the PMU portion 202 includes a voltage detection module 240 connected with a voltage indicator module 250 located within the processor portion 201. The voltage indicator module 250 monitors an input power supply voltage supplied to the processor portion 201, and outputs its value to the voltage detection module 240. Those skilled in the relevant art(s) will recognize that the function of the voltage indicator module 250 can be satisfied simply by the voltage detection module 240 monitoring an input power supply line for the processor portion 201.

Upon receipt of the input power supply voltage, the voltage detection module 240 determines if the input power supply voltage of the processor portion is acceptable by comparing the input power supply voltage to a predetermined threshold. If the input power supply voltage is below the predetermined threshold, the voltage detection module 240 outputs an "insufficient power" signal to the isolation control module 230. If, on the other hand, the voltage detection module 240 determines that the input power supply voltage exceeds the predetermined threshold, the voltage detection module 240 outputs a "sufficient power" signal to the isolation control module 230.

Figure 3:
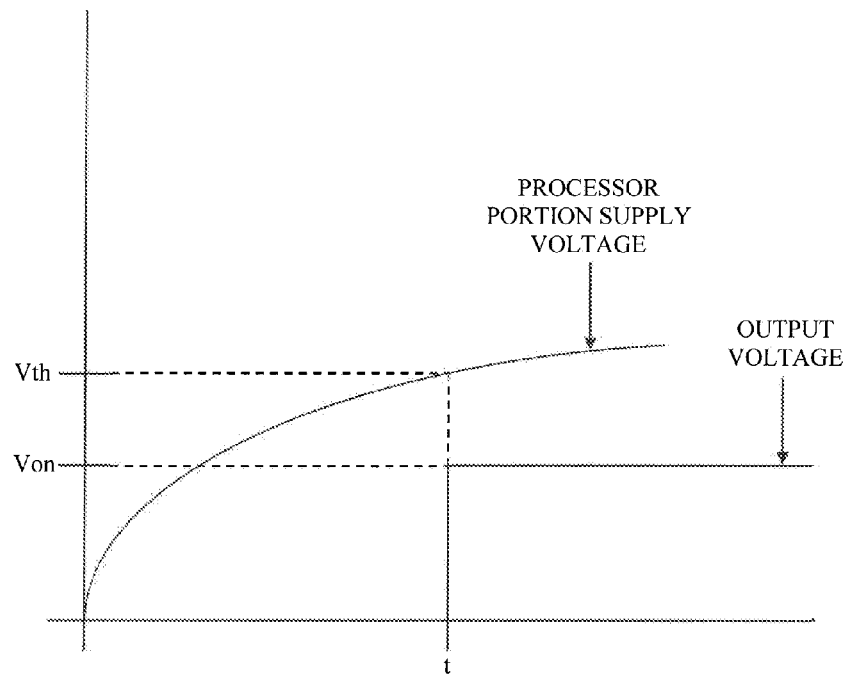
FIG. 3 illustrates a diagram of the operation of a voltage detector module located inside the integrated circuit according to an exemplary embodiment of the invention.

FIG. 3 illustrates a diagram of the exemplary operation of a voltage detector module located inside an integrated circuit according to an exemplary embodiment of the invention.

The vertical axis indicates voltage and the horizontal axis indicates time. As shows in FIG. 3, while the input voltage (i.e., the power supply voltage supplied to the processor portion) is below the predetermined threshold Vth, the voltage detector module determines the power to be insufficient. Therefore, the voltage detector module outputs the "insufficient power" signal (i.e., zero) to the isolation control module 230. Once the input voltage exceeds the predetermined threshold Vth, the voltage detector module outputs the "sufficient power" signal Von.

With reference again to FIG. 2, the isolation control module 230 receives the signals from the start-up module 260 and the voltage detection module 240, and determines whether all conditions have been satisfied to release the isolation of the PMU portion 202. If the isolation control module 230 determines, based on the received signals, that all conditions have been satisfied (i.e., that the start-up is complete and that the processor portion 201 is receiving sufficient power), the isolation control module 230 releases the isolation of the PMU portion 202 and allows the PMU portion 202 to receive the functional signals.

Those skilled in the relevant art(s) will recognize that many modifications may be made to the integrated circuit 200 of this embodiment within the spirit and scope of the present invention. For example, the voltage detection module 240 may be located within the processor portion 201, or the isolation control module 230 may perform a direct determination of the power supplied to the processor portion 201. In addition, the isolation control module 230 may require that only one of the above conditions are satisfied, or may require additional conditions to also be satisfied, in order to release the isolation of the PMU portion 202 within the spirit and scope of the present disclosure.

2. Test Mode Signals

Figure 4:
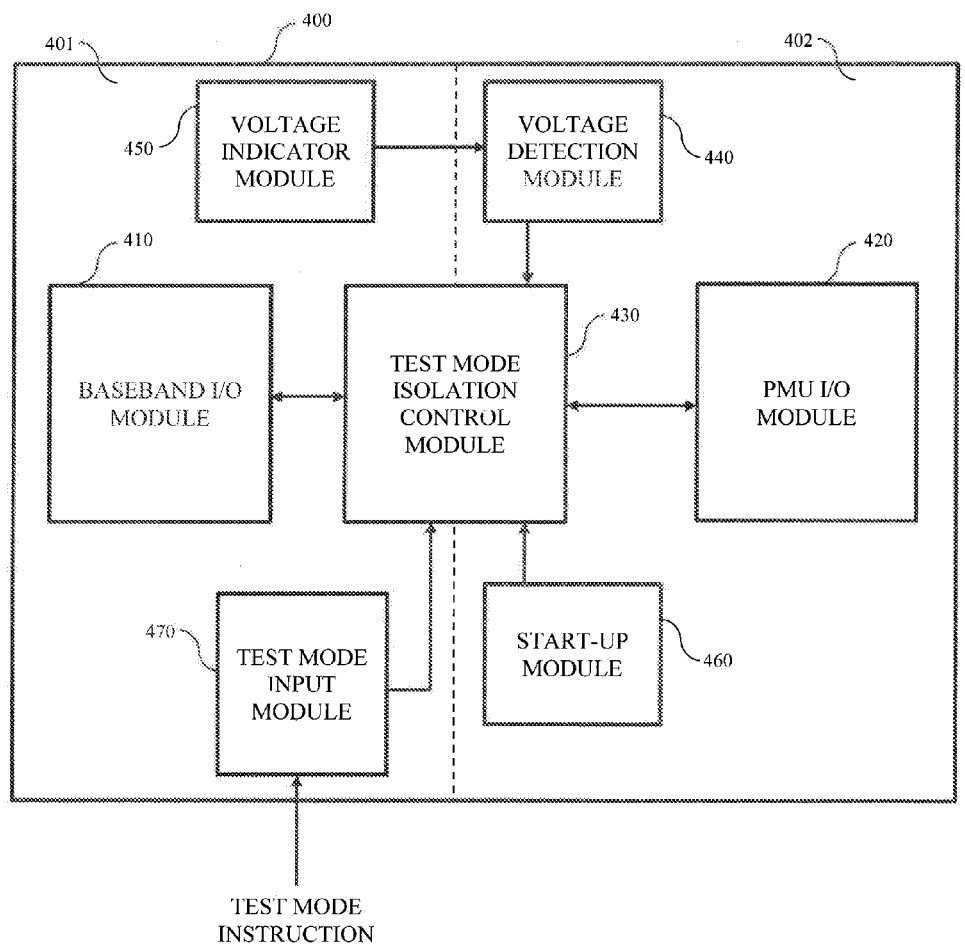
FIG. 4 illustrates an integrated circuit according to an exemplary embodiment of the invention.

FIG. 4 illustrates an integrated circuit 400 according to an exemplary embodiment of the invention. The integrated circuit 400 includes a test mode input module 470 and a test mode isolation control module 430, and may represent an exemplary embodiment of the integrated circuit 100. The test mode isolation control module 430 may represent an exemplary embodiment of the isolation control module 130.

Because of its integration with the processor portion 401, the PMU portion 402 may have a reduced number of dedicated pins through which it can receive test mode signals. Consequently, test mode signals may instead be received from the processor portion 401. It should be noted that one difference between isolation of test mode signals and isolation of functional signals is that test mode isolation control can be relieved without waiting for start-up module 460. Therefore, if something is found to be wrong during the PMU start-up sequence, one can debug that issue going through the baseband. In addition, the PMU includes a combined pin both for test mode and compensation cap. This pin may be used to release isolation gates of the PMU portion 402 to protect against the processor portion 401 working incorrectly.

The processor portion 401 includes a test mode input module 470 that receives test mode instruction signals from outside of the integrated circuit 400. Because the test mode instruction signals are received in the processor portion 401, the test mode signals must pass through the test mode isolation control module 430 before being received by the PMU portion 402.

The test mode isolation control module 430 operates in a substantially similar manner as the isolation control module 230. The test mode isolation control module 430 permits/prevents the transmission of the test mode signals to the PMU I/O module 420 depending on whether certain conditions have been satisfied.

First, the test mode isolation control module 430 preferably requires that the processor portion 401 is receiving sufficient power (as detected by the voltage detection module 440), as discussed above with respect to functional signals. In addition, the test mode isolation control module 430 also preferably ensures that the integrated circuit 400 is actually receiving a test mode instruction.

Until the receipt of the test mode instruction, the test mode input module 470 outputs a "normal mode" signal to the test mode isolation control module 430, thus causing the test mode isolation module 430 to continue to operate under normal mode conditions (see above) until test mode has been initiated. During this condition, the test mode isolation control module 430 isolates the PMU portion 402 from any signals received by the test mode input module 470.

Once the test mode input module 470 receives a test mode instruction, the test mode input module 470 outputs a "test mode" signal to the test mode isolation control module 430. At this time, provided that all the other conditions have been satisfied, the test mode isolation control module 430 releases the isolation of the PMU portion 402 with respect to test mode signals. In other words, the test mode isolation control module 430 allows the test mode instruction signals received by the test mode input module 470 to be received by the PMU I/O module 420, thereby initiating a test mode, as discussed in detail below.

Those skilled in the relevant art(s) will recognize that many modifications may be made to the integrated circuit 400 of this embodiment within the spirit and scope of the present invention. For example, the test mode isolation control circuit 430 may require fewer than, or more than, the above-described conditions for permitting the PMU portion 402 to receive test mode signals.

An Exemplary Integrated Circuit for Allowing Testing of a PMU Contained Therein

Figure 5:
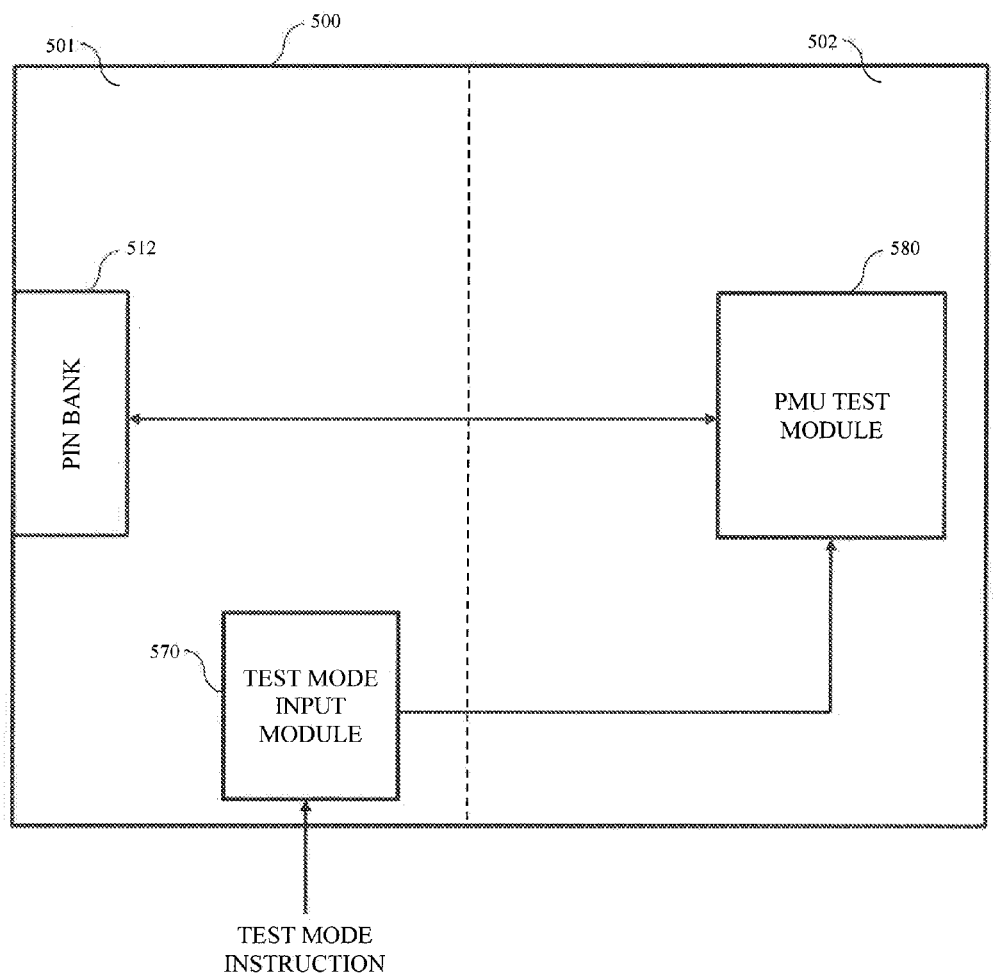
FIG. 5 illustrates an integrated circuit according to an exemplary embodiment of the invention.

FIG. 5 illustrates an integrated circuit 500 according to an exemplary embodiment of the invention. The integrated circuit 500 includes a PMU test module 580 and a pin bank 512, and may represent an exemplary embodiment of the integrated circuit 100. For simplicity of discussion, any functionality of the integrated circuit 500 unrelated to testing the PMU portion 502 is omitted from this discussion, as well as from the corresponding figure.

Once the isolation control module has released the PMU portion 502 to receive test signals, the integrated circuit has successfully entered general test mode. The following discussion presumes that all conditions have been, and remain, satisfied for the PMU portion 502 to receive signals from the test mode input module 570.

In the general test mode, the test mode input module 570 receives a test mode instruction from outside of the integrated circuit 500. The test mode instruction is preferably a test signal that complies with Joint Test Action Group (JTAG) signal and that is capable of specifying one of several particular test modes for the PMU portion 502. JTAG has recently been standardized as the IEEE 1149.1 Standard Test Access Port and Boundary-Scan Architecture, the specification of which is incorporated herein in its entirety by reference. Once received, the test mode input module forwards the test mode instruction signal to the PMU test module 580.

The PMU test module 580 determines the particular test mode from the received test mode instruction signal. This may be performed by the PMU test module 580 storing the plurality of particular test modes and their corresponding configurations in a memory, and selecting the particular test mode identified by the test mode instruction signal, to provide an example. Once the particular test mode has been determined, the PMU test module 580 configures the PMU portion 502 accordingly. For example, the PMU test module 580 may configure the PMU portion 502 to provide signal values to the PMU test module 580, or may configure the PMU portion 502 to shut down or turn on certain components contained therein.

In addition to configuring the PMU portion 502, the PMU test module 580 also configures pins of the pin bank 512. The pin bank 512 includes a plurality of pins that can be freely configured depending on the needs of the PMU portion 502, such as GPIO (General Purpose Input/Output) pins. Each particular test mode may include a corresponding pin configuration for the pins of the pin bank 512. Therefore, depending on the particular test mode selected, the PMU test module 580 may configure the pins of the pin bank 512 to satisfy the signal and pin requirements of the particular test mode.

By receiving programmable test mode signals, the PMU test module 580 can be programmed with any number of particular test modes. In addition, by utilizing configurable pins located on the processor portion 501, the PMU portion 502 is able to send and receive significant amounts of information relating to the tests. In this manner, even though the PMU portion 502 includes a very limited number of dedicated pins and has almost no direct visibility, the PMU portion 502 is nonetheless capable of diverse and robust testing.

Those skilled in the relevant art(s) will recognize that many modifications may be made to the integrated circuit 500 within the spirit and scope of the present invention. For example, the PMU portion 502 may include one or more dedicated pins and may be configured to use the pin bank 512 in conjunction with its dedicated pins.

An Exemplary Method of Protecting a PMU Portion of an Integrated Circuit

Figure 6:
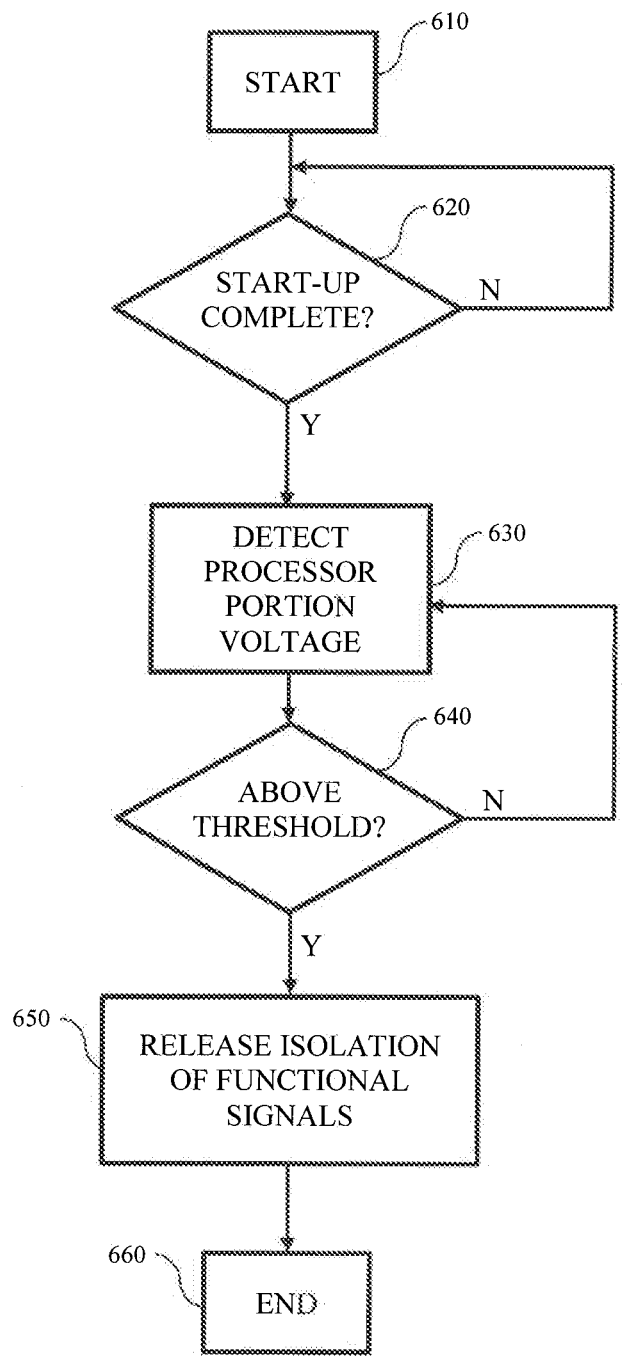
FIG. 6 illustrates a block diagram of a method for isolating a power management module from a processor module within an integrated circuit according to an exemplary embodiment of the invention.

FIG. 6 illustrates a block diagram of a method for isolating a power management module from functional signals received from a processor module within an integrated circuit according to an exemplary embodiment of the invention.

The method begins at step 610. Initially, the PMU portion is isolated from the functional signals and is prohibited from receiving such signals from the processor module. The method immediately proceeds to step 620. In step 620, a determination is made as to whether the PMU portion has completed its power start-up sequence. If it is determined that the start-up sequence is not complete, the method returns to step 620. If, on the other hand, the method determines that the start-up sequence is complete, the method proceeds to step 630.

In step 630, a supply voltage being supplied to the processor module is detected. The method then proceeds to step 640. In step 640, the detected supply voltage is compared to a predetermined threshold. If the detected supply voltage is below the threshold, the method returns to step 630 to again detect the voltage. In this manner, the method ensures that the PMU remains isolated from functional signals until the processor module is sufficiently powered. In step 640, if the detected supply voltage exceeds the predetermined threshold, the method proceeds to step 650. In step 650, the isolation of the PMU portion is released with respect to functional signals. Thus, functional signals are permitted to be received by the PMU portion from the processor module. The method then proceeds to step 660, where the method ends.

Those skilled in the relevant art(s) will recognize that the above method can also continuously monitor the supply voltage being supplied to the processor module, and terminate the method any time the voltage falls below the predetermined threshold. Those skilled in the relevant art(s) will also recognize that the above method can additionally or alternatively include any of the functionality of the integrated circuit 200 discussed above, as well as any of its modifications. Further, the above description of the exemplary method should neither be construed to limit the method nor the description of the integrated circuit 200.

An Exemplary Method of Protecting a PMU Portion of an Integrated Circuit

FIG. 7 illustrates a block diagram of a method for allowing test mode signals to be received by the power management portion from the processor module within an integrated circuit according to an exemplary embodiment of the invention.

The method begins at step 710. Initially, the PMU portion is isolated from the test mode signals and is prohibited from receiving such signals from the processor module. The method immediately proceeds to step 720. In step 720, a determination is made as to whether the PMU portion has completed its power start-up sequence. If it is determined that the start-up sequence is not complete, the method returns to step 720. If, on the other hand, the method determines that the start-up sequence is complete, the method proceeds to step 730.

In step 730, a supply voltage being supplied to the processor module is detected. The method then proceeds to step 740. In step 740, the detected supply voltage is compared to a predetermined threshold. If the detected supply voltage is below the threshold, the method returns to step 730 to again detect the voltage. In this manner, the method ensures that the PMU remains isolated from functional signals until the processor module is sufficiently powered. In step 740, it the detected supply voltage exceeds the predetermined threshold, the method proceeds to step 750. As previously discussed, although the PMU and processor module must be powered, the entire reset sequence need not be complete.

In step 750, it is determined whether the integrated circuit is receiving a test mode signal for the PMU portion. If it is determined that no test mode signal is being received, the method returns to step 750 to again detect the presence of a test mode signal. If, on the other hand, it is determined that a test mode signal is being received for the PMU portion, the method proceeds to step 760.

In step 760, the isolation of the PMU portion is released with respect to test mode signals. Thus, test mode signals are permitted to be received by the PMU portion from the processor module. The method then proceeds to step 770, where the method ends.

Those skilled in the relevant art(s) will recognize that the above method can also continuously monitor the supply voltage being supplied to the processor module, and terminate the method any time the voltage falls below the predetermined threshold. Those skilled in the relevant art(s) will also recognize that the above method can additionally or alternatively include any of the functionality of the integrated circuit 400 discussed above, as well as any of its modifications. Further, the above description of the exemplary method should neither be construed to limit the method nor the description of the integrated circuit 400.

An Exemplary Method of Testing a PMU Portion Within an Integrated Circuit Containing Another Processing Portion FIG. 8 illustrates a block diagram of a method for entering and performing a test mode for a PMU portion of an integrated circuit according to an exemplary embodiment of the present invention.

The method begins at step 810. For the following discussion, it is presumed that the integrated circuit has successfully determined that test mode signals will be permitted to be received by the PMU portion. Once isolation of the PMU portion with respect to test mode signals has been released, the method proceeds to step 820.

In step 820, because the PMU portion has limited pins with which to receive signals, test mode signals are input into the processor portion of the integrated circuit. The test mode signals are preferably JTAG signals. The method then proceeds to step 830. In step 830, the test mode signals are sent from the processor portion to the PMU portion. The method then proceeds to step 840.

In step 840, a specific test mode is determined from the test mode signal. The method then proceeds to step 850. In step 850, the PMU portion configures a plurality of pins located on the processor portion of the integrated circuit in accordance with the specific test mode. Preferably the plurality of pins are GPIO pins. The method then proceeds to step 860, where the method ends.

Those skilled in the relevant art(s) will recognize that the above method can additionally or alternatively include any of the functionality of the integrated circuit 500 discussed above, as well as any of its modifications. Further, the above description of the exemplary method should neither be construed to limit the method nor the description of the integrated circuit 500.

Those skilled in the relevant art(s) will also recognize that the above methods are not mutually exclusive and may be employed in any combination with one another.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. An integrated circuit that is included in a host electronic device, comprising:
    a processor portion that includes:
        a test mode input module configured to receive a test mode instruction signal from off-chip; and
        an I/O module having a plurality of pins, configured to communicate with off-chip components; and
    a power management portion configured to manage a power of the electronic device, the power management portion including:
        a test module configured to set a test mode within the power management portion based on the test mode instruction signal received by the test mode input module,
    wherein the test module is configured to output test result signals via the I/O module, and
    wherein the plurality of pins provide a communication channel between the processor portion and the off-chip components during a normal mode of operation, and provide a communication channel between the power management portion and the off-chip components after the test mode has been set by the test module.

2. The integrated circuit of claim 1, wherein the test mode instruction signal is a Joint Test Action Group (JTAG) signal.

3. The integrated circuit of claim 1, wherein the plurality of pins of the I/O module are General Purpose Input/Output (GPIO) pins.

4. The integrated circuit of claim 3, wherein the power management portion configures the plurality of GPIO pins based on the set test mode.

5. An integrated circuit that is included in a host electronic device, comprising:
    a power management portion configured to manage a power of the electronic device;
    a processor portion; and
    an isolation control module configured to control an electrical isolation between the power management portion and the processor portion by restricting whether signals can be received by the power management module from the processor portion based on one or more conditions,
    wherein the one or more conditions include whether a power start-up sequence is complete and whether the processor portion is receiving sufficient power.

6. The integrated circuit of claim 5, wherein the processor portion is a Baseband Processor.

7. The integrated circuit of claim 5, wherein the isolation control module includes a plurality of isolation gates that open or close based on the one or more conditions.

8. The integrated circuit of claim 5, wherein the power management portion includes a voltage detector module configured to detect a supply voltage supplied to the processor portion.

9. The integrated circuit of claim 8, wherein the isolation control module controls the electrical isolation of the power management portion from the processor portion based on the supply voltage detected by the voltage detector module.

10. The integrated circuit of claim 8, wherein the isolation control module isolates the power management portion from the processor portion when the supply voltage detected by the voltage detector module is below a predetermined threshold, and
    wherein the isolation control module permits communication between the power management portion and the processor portion when the supply voltage detected by the voltage detector module is above the predetermined threshold.

11. The integrated circuit of claim 8, wherein the processor portion includes a test mode input module configured to receive a test mode signal for input to the integrated circuit.

12. The integrated circuit of claim 11, wherein the test mode signal is a Joint Test Action Group (JTAG) signal.

13. The integrated circuit of claim 11, wherein the isolation control module isolates the power management module from the test mode signal based on whether a power start-up sequence is complete, whether the supply voltage detected by the voltage detection module exceeds a predetermined threshold, and whether the test mode input module is receiving the test mode signal.

14. The integrated circuit of claim 11, wherein the power management portion includes a test module configured to receive the test mode signal from the test mode input module and to set a test mode based on the received test mode signal.

15. The integrated circuit of claim 11, wherein the processor portion includes an I/O module, and wherein the power management portion outputs test result signals via the I/O module.

16. The integrated circuit of claim 15, wherein the I/O module includes a plurality of General Purposes Input/Ouput (GPIO) pins.

17. The integrated circuit of claim 16, wherein the power management portion configures the plurality of GPIO pins based on the received test mode signal.

18. The integrated circuit of claim 11, wherein the isolation control module isolates the power management module from the test mode signal based on whether the supply voltage detected by the voltage detection module exceeds a predetermined threshold and whether the test mode input module is receiving the test mode signal, and regardless of whether a power start-up sequence is complete.

19. The integrated circuit of claim 1, further comprising an isolation control module that defines an electrical boundary between the processor portion and the power management portion, the isolation control module configured to restrict access to the I/O module by the power management portion during the normal mode of operation, and to permit access to the I/O module by the power management portion after the test mode has been set provided that at least one condition has been met.

20. The integrated circuit of claim 19, wherein the isolation control module is further configured to prevent the test mode instruction signal received by the test mode input module to be received by the test module until the at least one condition has been met.

* * * * *

UNITED STATES PATENT AND TRADEMARK OFFICE
CERTIFICATE OF CORRECTION

PATENT NO. : 8,856,559 B2  Page 1 of 1
APPLICATION NO. : 13/437675
DATED : October 7, 2014
INVENTOR(S) : Alarcon et al.

It is certified that error appears in the above-identified patent and that said Letters Patent is hereby corrected as shown below:

On the Title Page, Item (54), Title, and in the Specification, column 1, line 3, please replace "ON OR" with --ON ONE OR--.

In the Claims

Column 11, line 14, please replace "pins, configured" with --pins configured--.

Signed and Sealed this
Seventeenth Day of February, 2015

Michelle K. Lee
*Deputy Director of the United States Patent and Trademark Office*